United States Patent [19]

Bronstein

[11] Patent Number: 4,510,923
[45] Date of Patent: Apr. 16, 1985

[54] SOLAR REFLECTOR

[76] Inventor: Allen I. Bronstein, 715 Florales, Palo Alto, Calif. 94306

[21] Appl. No.: 526,632

[22] Filed: Aug. 26, 1983

[51] Int. Cl.³ .............................................. F24J 3/02
[52] U.S. Cl. .................................. 126/438; 350/625; 350/633
[58] Field of Search .................. 126/438, 439, 451; 350/288, 289, 293, 295, 309, 310, 320

[56] References Cited

U.S. PATENT DOCUMENTS

| | | | |
|---|---|---|---|
| 4,106,484 | 8/1978 | Dame | 126/438 |
| 4,173,397 | 11/1979 | Simpson | 126/438 X |
| 4,220,136 | 9/1980 | Penney | 126/438 |
| 4,243,019 | 1/1981 | Severson | 126/438 |
| 4,293,192 | 10/1981 | Bronstein | 350/296 |
| 4,358,183 | 11/1982 | Whiteford | 350/296 X |

Primary Examiner—Larry Jones
Attorney, Agent, or Firm—Fliesler, Dubb, Meyer & Lovejoy

[57] ABSTRACT

A solar reflector (12a, 12b) is set forth. A longitudinally extending frame structure (14) includes first (28) and second (30) frame end closures (28, 30). A first form member (32a, 32b) is attached in-board of the first end closure (28). A second form member (34a, 34b) is generally parallel to the first form member (32a, 32b) and in-board of the second end closure (30). The first (32a, 32b) and second (34a, 34b) form members (32a, 32b, 34a, 34b) have peripheries (36a, 36b, 38a, 38b) having identical form surfaces (40a, 40b, 42a, 42b) along portions thereof. A support member (44a, 44b) is attached to a respective one (30 or 34a, 34b) of the second end closure (30) and the second form member (34a, 34b) and extends toward a respective other thereof. The support member (44a, 44b) is adapted for transferring the weight of the second form member (34a, 34b) to the second end closure (30). A flexible sheet (60a, 60b) of a material having a reflective in-facing surface (62) and having opposite edges (64, 66) is provided which is adapted for attachment to the identical form surfaces (40a, 40b, 42a, 42b). The flexible sheet (60a, 60b) has lateral edges (68, 70) generally perpendicular to the first and second frame members (32a, 32b, 34a, 34b). A securing structure (72a, 72b, 74a, 74b) is provided for securing the opposite edges (64, 66) of the flexible sheet (60) to the identical form surfaces (40a, 40b, 42a, 42b). The sheet (60) is stretched between the form members (32a, 32b, 34a, 34b). An easy-to-assemble and relatively light solar reflector (12a, 12b) is thus provided.

17 Claims, 9 Drawing Figures

SOLAR REFLECTOR

TECHNICAL FIELD

The present invention relates to a solar reflector of a nature whereby incoming radiation is directed to an absorber of the nature of a pipe located at a focus of a reflector, which pipe would normally contain a heat-transfer medium.

BACKGROUND ART

Generally, reflecting solar troughs are made of shiny metal sheets which are backed by supporting ribs. Primarily because of manufacturing limitations at the mill there are necessary restrictions on the areas of the sheets. Consequently, a multiplicity of reflectors are often required for a given solar energy project. As a rule, the sheets with rigid supporting ribs are assembled at a plant site because of the difficulty and expense in attempting to assemble the sheets and ribs in the field. As a result, the mirrors are heavy and bulky and difficult to ship. This adds cost to the finished product.

U.S. Pat. No. 4,293,192, issued Oct. 6, 1981, to Allen I. Bronstein, sets forth a solar reflector which is collapsible and portable and which will maintain its true configuration without the requirement of supporting ribs. The invention of U.S. Pat. No. 4,293,192 includes the use of a slideway on which two form members are supported, the form members having identical surfaces around a portion of their peripheries, which identical surfaces conform precisely to the desired configuration of the reflecting surface. A sheet of highly reflecting material is wrapped tightly around the surfaces and secured in place, and at least one of the forms is mounted on a slide which is moved away from the other form until the flexible sheet is in tension. Thereby, the flexible sheet conforms precisely to the curve of the form surfaces over its full length. The slideway is pivoted on support legs so that it may be tilted at a selected angle, depending on the angle of the sun. Strips of tape may be adhered to the outer or convex surface of the material to dampen it against wind vibration.

While the invention of U.S. Pat. No. 4,293,192 provides significant advantages over the prior art rib-supported solar reflectors, the apparatus taught therein is of relatively heavy construction, is not as easily tiltable as might be desired, is not readily expandable to form a bank of solar reflectors which are adjustable together, and is not as readily assemblable as might be desired.

DISCLOSURE OF INVENTION

The present invention is directed to overcoming one or more of the problems as set forth above.

In accordance with one embodiment of the present invention, a solar reflector is provided. The solar reflector comprises a longitudinally extending frame structure which defines first and second frame ends and at least a second end closure. A first form member is attached generally in-board of the first end. A second form member is provided which is parallel to the first form member and in-board of the second end closure. The first and second form members have peripheries having identical form surfaces along portions thereof. A support member is attached to a respective one of the second end closure and the second form member and extends toward a respective other thereof. The support member is adapted for transferring the weight of the second form member to the second end closure. A flexible sheet of a material having a reflective in-facing surface and having opposite edges adapted for attachment to the identical form surfaces is likewise provided. Securing means are provided for securing the opposite edges to the identical form surfaces. Stretching means are provided for stretching the flexible sheet between the first and second form members.

A solar reflector as set out above has several advantages over its prior art predecessors. First, it is relatively easy to assemble. Second, it is relatively light. Third, a plurality of such solar reflectors can generally be mounted on a single frame structure. Fourth, the frame structure can be made tiltable to allow adjustment for different sun angles if so desired. Fifth, the entire frame for the plurality of such reflectors can be balanced on a single pillow block whereby tilt adjustment can be accomplished with a minimal expansion of energy.

BRIEF DESCRIPTION OF THE DRAWINGS

The invention will be better understood by reference to the figures of the drawings wherein like numbers denote like parts throughout and wherein.

BEST MODE FOR CARRYING OUT INVENTION

Figure 1:
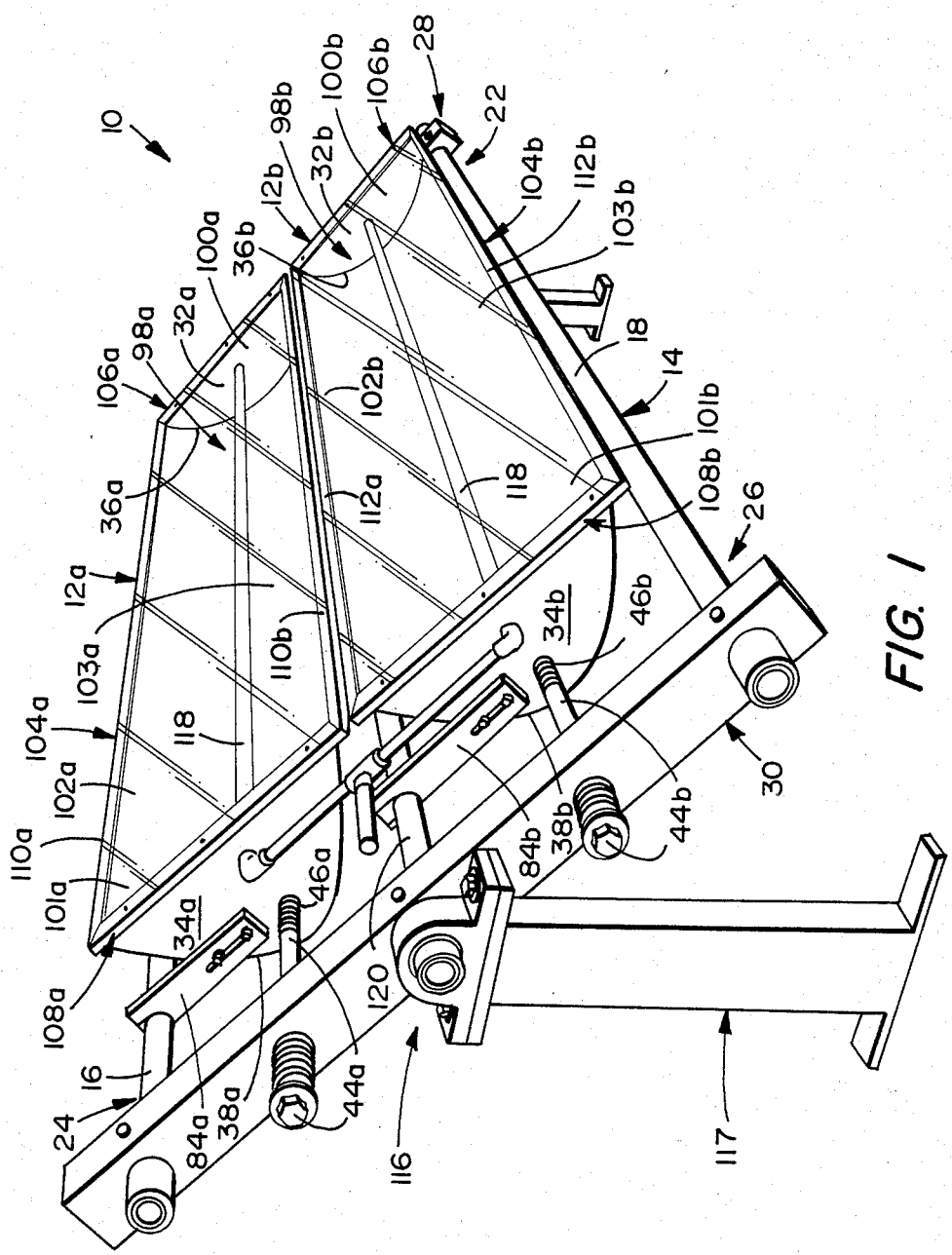
FIG. 1 illustrates, in perspective, a solar reflecting apparatus in accordance with an embodiment of the present invention.
Figure 2:
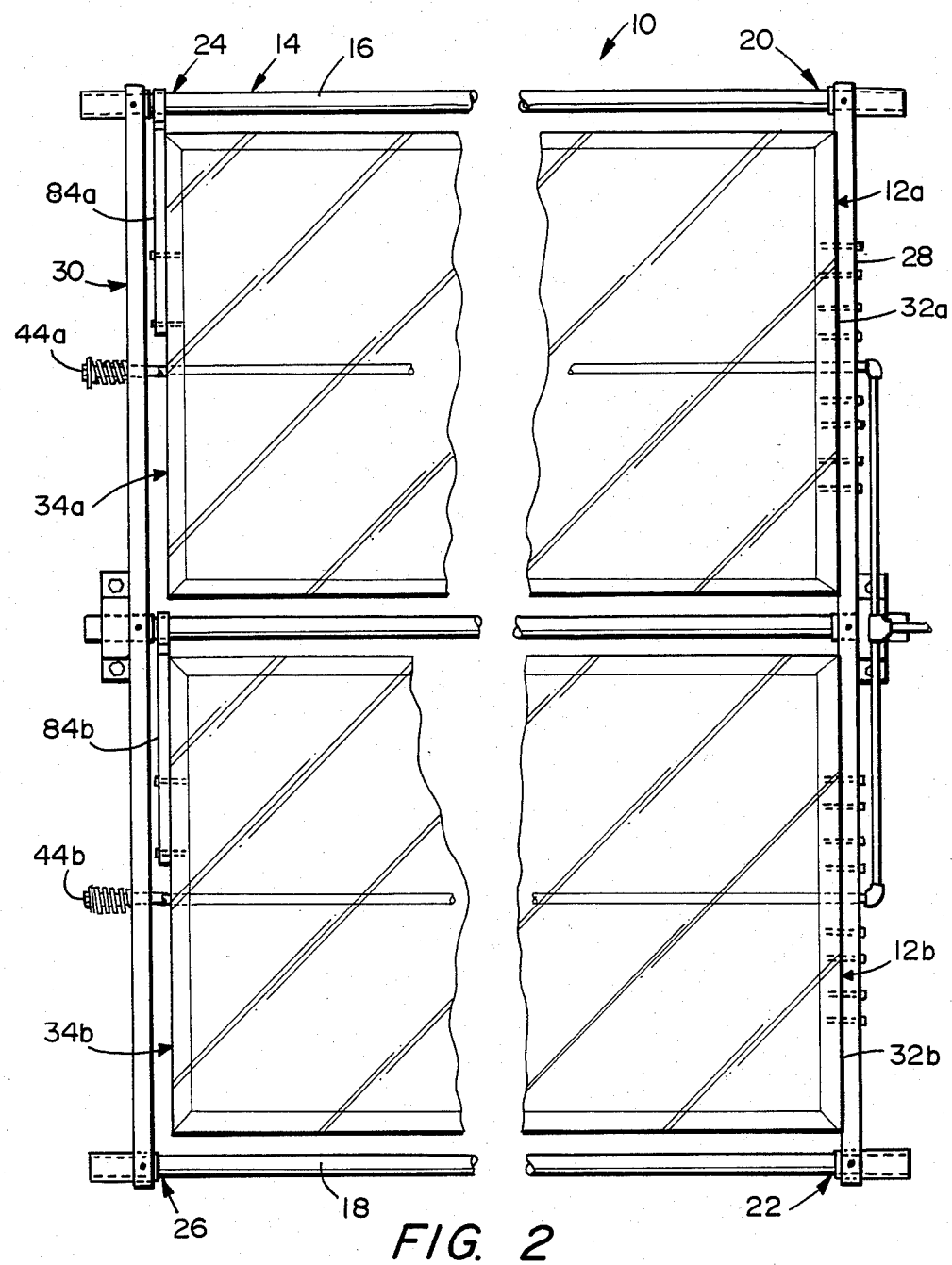
FIG. 2 illustrates, in plan view, a solar reflector in accordance with an embodiment of the present invention.

FIGS. 1 and 2 illustrate a solar reflector unit 10 having two solar reflectors 12a and 12b in accordance with the present invention. A longitudinally extending frame structure 14 is shown which, in the embodiment illustrated, has first 16 and second 18 generally parallel and longitudinally extending, spaced-apart, lateral frame members 16, 18. The lateral frame members 16, 18 have respective first ends 20 and 22 and second ends 24 and 26. The frame structure 14 also has first 28 and second 30 generally parallel frame end closures 28 and 30. The first end closure 28 connects the first ends 20 and 22, and the second end closure 30 connects the second ends 24 and 26 of the lateral frame members 16 and 18.

A first form member 32a, 32b is attached to extend generally parallel to and in-board of the first end closure 28. The first form member 32 is generally parallel to the first end closure 28 and generally perpendicular to the lateral frame members 16 and 18.

Figure 3:
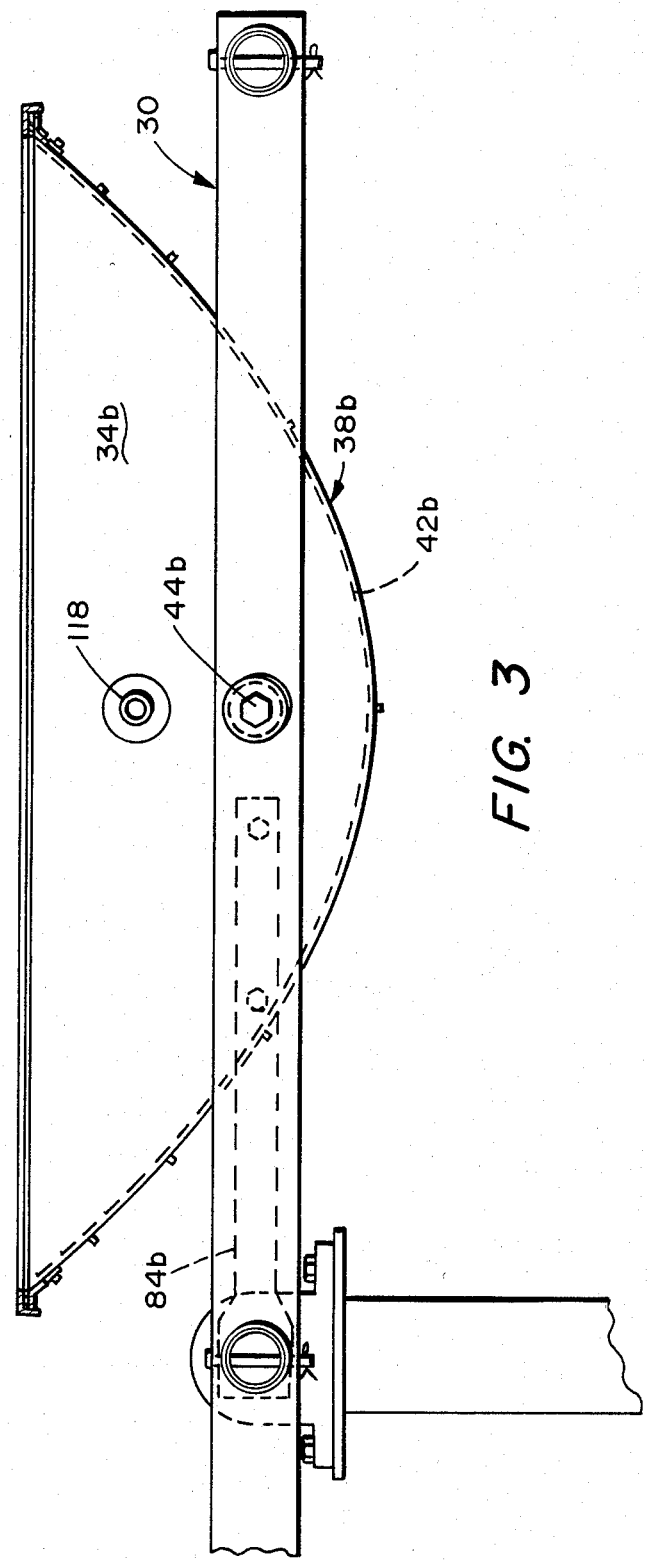
FIG. 3 illustrates, in side view, a portion of a solar reflector in accordance with an embodiment of the present invention.
Figure 4:
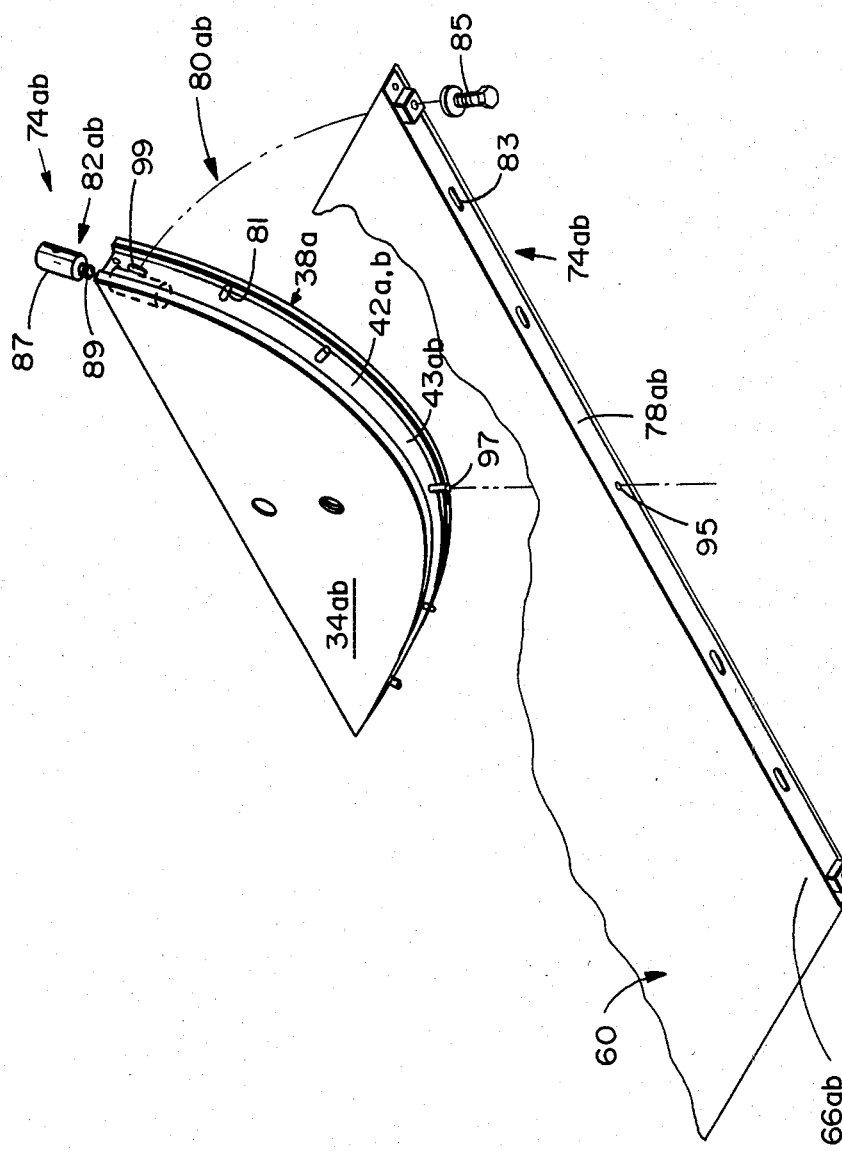
FIG. 4 illustrates, in a partial exploded view, in perspective, a portion of a solar reflector in accordance with an embodiment of the present invention.
Figure 5:
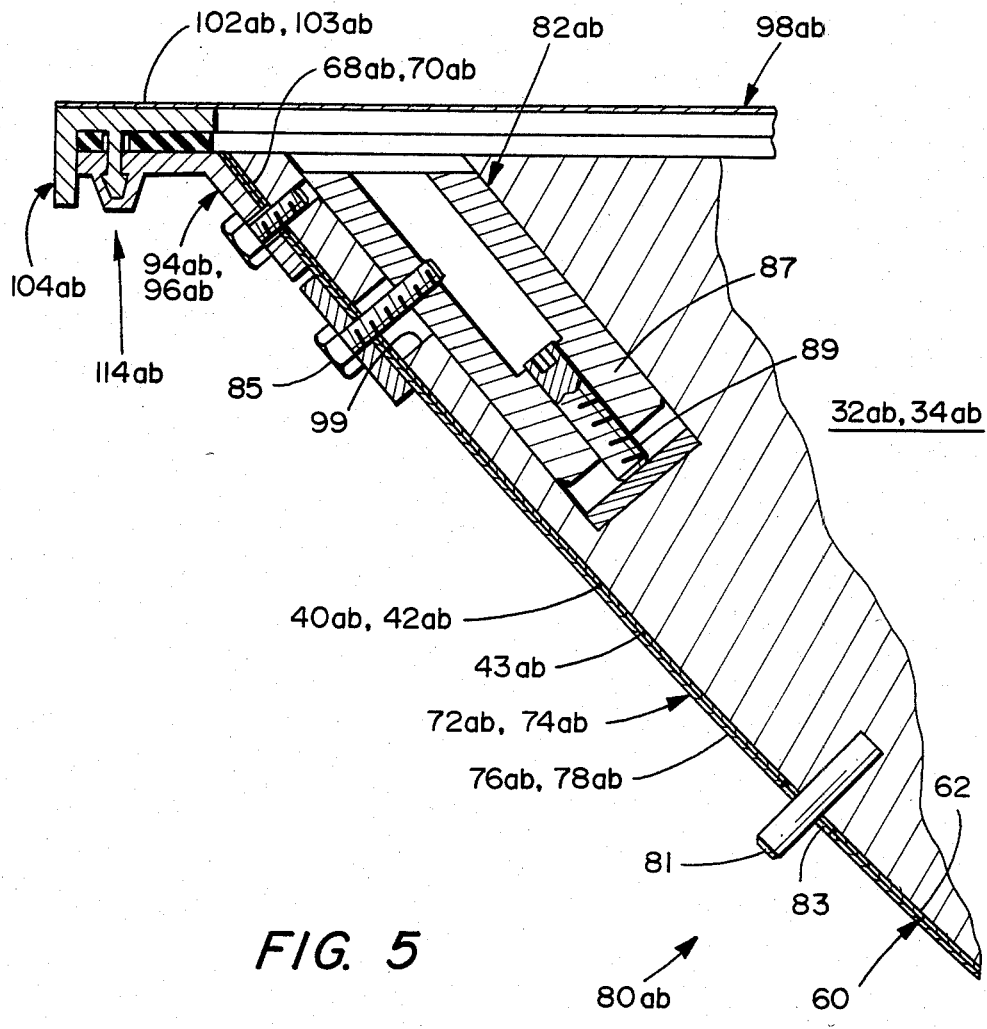
FIG. 5 illustrates, partially in section, a detail in accordance with an embodiment of the present invention in accordance with FIG. 4.
Figure 6:
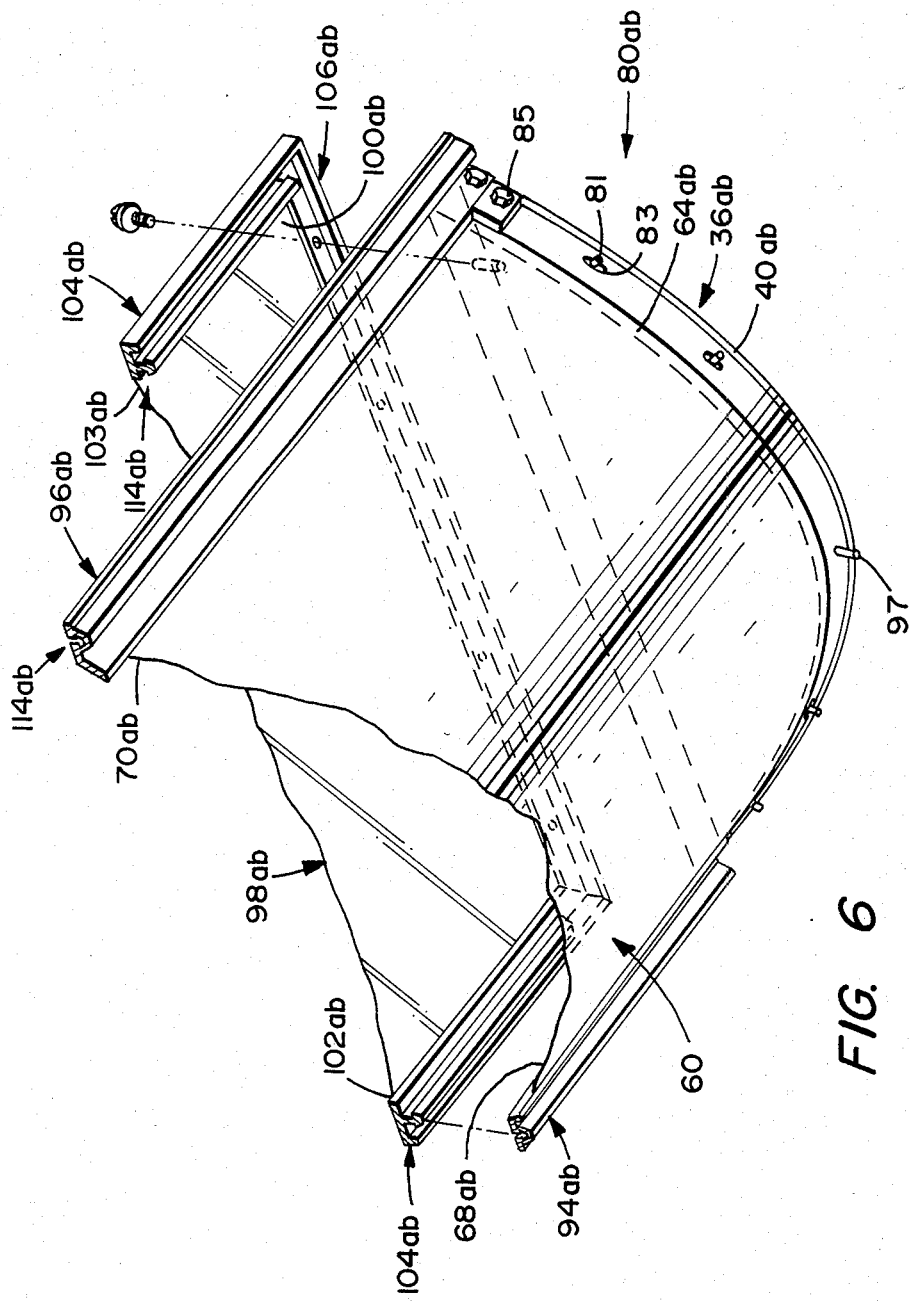
FIG. 6 illustrates, in partial perspective exploded view, a portion of a solar reflector in accordance with an embodiment of the present invention.

A second form member 34a, 34b is parallel to the first form member 32a, 32b and in-board of the second end closure 30. The first 32a, 32b and second 34a, 34b form member 32a, 32b, 34a, 34b have peripheries 36a, 36b, 38a, 38b having identical form surfaces 40a, 40b, 42a, 42b (See FIGS. 3, 4 and 5) along portions thereof. Trenches 43a,43b are located just outboard of the form surfaces 40a,40b,42a,42b for a purpose which will shortly become apparent.

Figure 7:
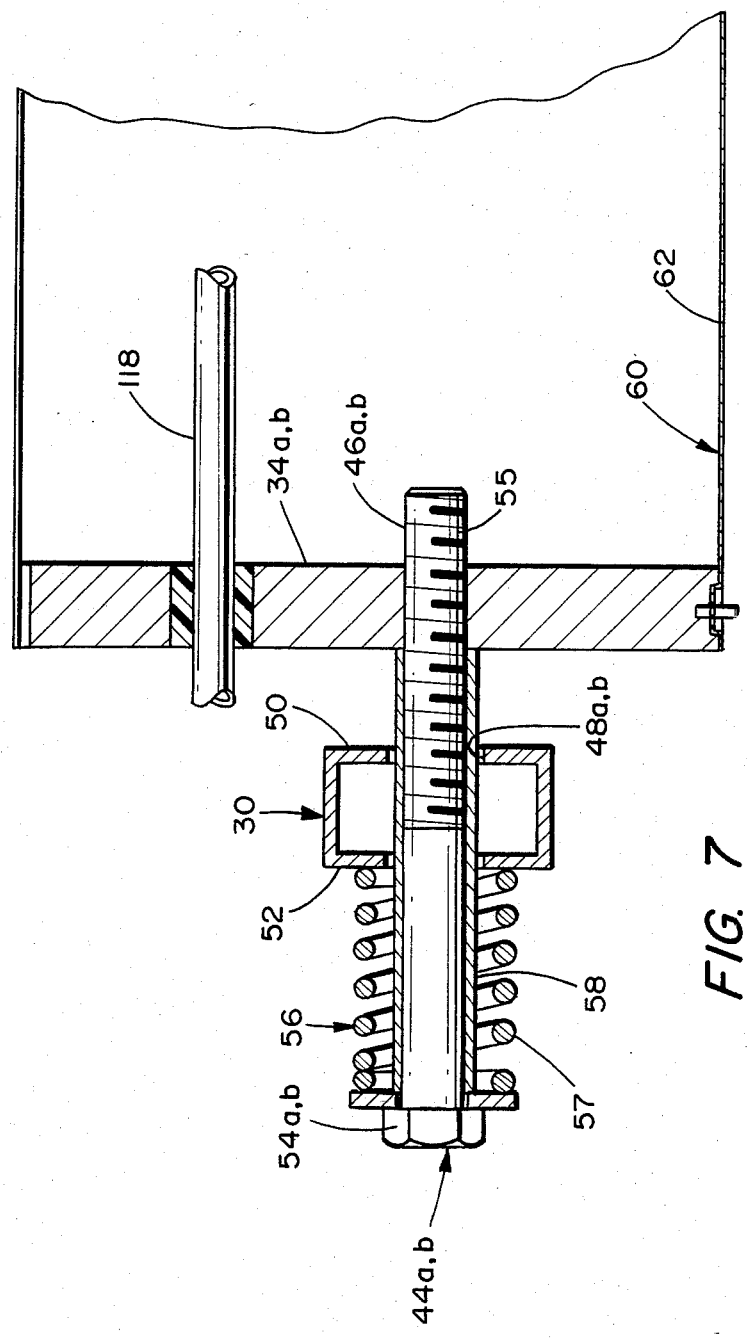
FIG. 7 illustrates, in partial view in section, a detail in a solar reflector in accordance with an embodiment of the present invention.

A support member 44a, 44b, best seen in FIG. 7 and wherein the designation "ab" represents the designations "a" and "b" in other Figures, is attached to a respective one, 30 or 34a, 34b, of said second end closure 30 and said second end form member 34a, 34b. The support member 44a, 44b extends toward a respective other, 34a, 34b or 30, of the second end closure 30 and the second form member 34a, 34b. The support member 44a, 44b is adapted for transferring the weight of the second form member 34a, 34b to the second end closure 30. The support member 44a, 44b is preferably in the form of a bolt having a first end 46a, 46b attached to the respective second form member 34a, 34b, generally centrally thereof. The second end closure 30 preferably includes an opening 48a, 48b therethrough from a second form member facing side 50 to a second form member removed side 52. The support member 44a, 44b further has a second end 54a, 54b which extends through the opening 48a, 48b. Threads 55 on the first end 46a,46b of the support member 44a,44b provide means for stretching a flexible sheet 60 between the first 32a,32b and second 34a,34b form members 32a,32b,-34a,34b so as to form the desired reflective configuration.

In accordance with the present invention, biasing means 56b is provided for biasing the second form member 34a, 34b toward the second end closure 30 sufficiently to compensate for any differences in thermal expansion characteristics of the materials of construction of the solar reflectors 12a,12b. In the particular embodiment illustrated, the biasing means 56 comprises a spring 57 which biases the second end 54a, 54b of the support member 44a, 44b away from the second form member removed side 52 of the second end closure 30. In accordance with a preferred embodiment of the present invention, a sleeve 58 is provided for spacing purposes. The sleeve 58 surrounds the support member 44a, 44b and is supported by, e.g., abuts, the second form member 34a, 34b. The sleeve 58 is selected to be of a length and construction sufficient to limit how closely the support member 44a, 44b can approach the second form member 34a, 34b. In accordance with the embodiment shown in FIG. 7, the support member 44a, 44b is in the nature of a bolt which can be screwed into the second form member 34a, 34b. The sleeve 58 limits how far the bolt 44a, 44b can be screwed into the second form member 34a, 34b, thereby providing for a desired and controlled amount of biasing of the second form member 34a, 34b toward the second form member facing side 50 of the second end closure 30. Alternatively, a toggle arrangement can be used to compress the spring 57 a predetermined amount.

Also in accordance with the present invention, the flexible sheet 60a,60b (see FIGS. 4-7) has a reflective in-facing surface 62. The flexible sheet 60a,60b has opposite edges 64a, 64b, 66a, 66b which are adapted for attachment to the identical form surfaces 40a, 40b, 42a, 42b of the first 32a, 32b and second 34a, 34b form members 32a, 32b, 34a, 34b. The flexible sheet 60a,60b also has lateral edges 68a, 68b, 70a, 70b which are generally perpendicular to the first 32a, 32b and second 34a, 34b form members 32a, 32b, 34a, and 34b. The flexible sheet can be made of plastic with an aluminized or other metal-coated surface, can be made of a sheet of metal such as aluminum, or can be made of any other material which has a reflective in-facing surface 62.

In accordance with the present invention, securing means 72a, 72b, 74a, 74b (See FIGS. 4 and 5) are provided for securing the opposite edges 64a, 64b, 66a, 66b of the flexible sheet 60a, 60b to the identical form surfaces 40a, 40b, 42a, 42b. The securing means 72a, 72b, 74a, 74b preferably includes first 76a, 76b and second 78a, 78b strap members 76a, 76b, 78a, 78b which are adapted for fitting in the trenches 43a,43b and means 80a, 80b in the embodiment illustrated pins 81, logitudinally extending slots 83, an opening 95 which matingly fits over an aligning pin 97, and bolts 85, for aligning the strap members 76a, 76b, 78a, 78b in fitting relation with the identical form surfaces 40a, 40b, 42a, 42b with the opposite edges 64a, 64b, 66a, 66b of the flexible sheet 60a, 60b sandwiched therebetween. Appropriate holes are provided in the opposite edges 64a, 64b, 66a, 66b of the flexible sheet 60a, 60b to accept the pins 81 and the aligning pin 97. In practice, it is preferred that the strap members 76a, 76b, 78a, 78b be bonded to the opposite edges 64a, 64b, 66a, 66b of the flexible sheet 60a, 60b. The sheet 60a, 60b is then stretched over the form surfaces 40a, 40b, 42a, 42b as the bolt 85 is tightened and the plug 87 is retracted. It is also preferred in accordance with the present invention that the securing means 72a, 72b, 74a, 74b further include means 82a, 82b, such as a plug 87 which may be moved longitudinally by tightening a bolt 89, for longitudinally tensioning the first 76a, 76b and second 78a, 78b strap members 76a, 76b, 78a, 78b for bearing inwardly against the opposite edges 64a, 64b, 66a, 66b of the flexible sheet 60a, 60b. The bolts 85 screw threadably engage in the plug 87 and move therewith to provide the needed tensioning. A slot 99 in the periphery 36a, 36b, 38a, 38b, allows appropriate movement of the bolt 85 with the plug 87.

Figure 8:
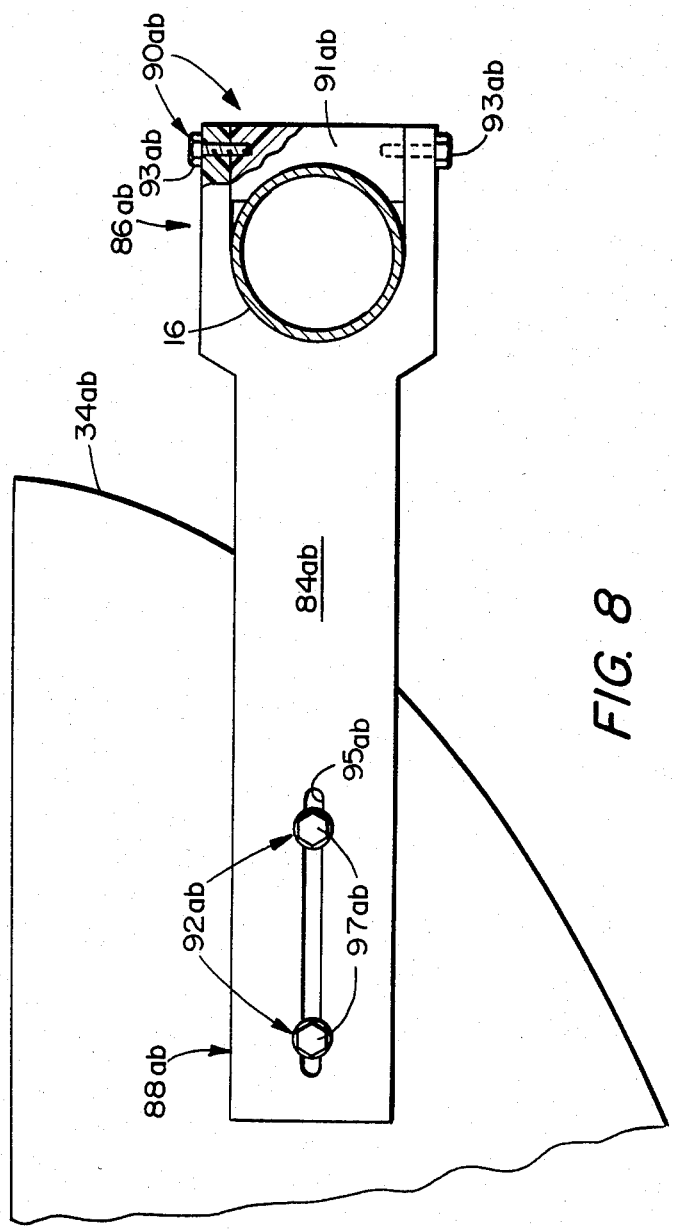
FIG. 8 illustrates another detail in the construction of a solar reflector in accordance with an embodiment of the present invention.

In accordance with a preferred embodiment of the present invention, an arm 84a, 84b is provided having first 86a, 86b and second 88a, 88b longitudinally separated portions 86a, 86b, 88a, 88b. The first portion 86a, 86b (See FIG. 8) is adjacent a respective one 16 or 18 of the lateral frame member 16, 18 or another relatively fixed support, and the second portion 88a, 88b is adjacent the second form member 34ab. Means 90a, 90b, for example, a wedge 91ab and set screws 93ab, is provided for attaching the first portion 86a, 86b to the respective one 16 or 18 of the lateral frame member 16, 18. Means 92a, 92b is provided for attaching the second portion 88a, 88b to the second form member 34a, 34b. The arm 84a, 84b serves for positioning the second form member 34a, 34b to allow proper adjustment of the support member 44a, 44b. The arm 84a, 84b works in conjunction with the support member 44a, 44b to prevent rotation of the second form member 34a, 34b to allow easy installation of the flexible sheet 60a, 60b. In the absence of the arm 84a, 84b, it is necessary for someone to support the second form member 34a, 34b while the support member 44a, 44b is fastened in place and adjusted. Thus, the arm 84a, 84b serves a very important function. Furthermore, the arm 84a, 84b also serves to provide stiffening for the solar reflector 12a, 12b. Alternative structures to the arm 84a, 84b are also usable. For example, a post may extend from a respective one of the second end closure 30 and the second member 34a, 34b and through a guide hole in a respective other thereof. The essential functioning provided is that of preventing rotation of the second member 34a, 34b relative to the second end closure 30. This is especially important during assembly but is also useful thereafter to provide increased structural integrity.

Further in accordance with the present invention (See FIGS. 5 and 6), it is preferred that first 94a, 94b and second 96a, 96b stiffening strips, 94a, 94b, 96a, 96b be attached to the lateral edges 68a, 68b, 70a, 70b of the flexible sheet 60 as by being bonded thereto by an appropriate adhesive. The stiffening strips 94a, 94b, 96a, 96b are generally attached to the lateral edges 68a, 68b, 70a, 70b after the sheet 60a, 60b has been placed under tension. The stiffening strips 94a, 94b, 96a, 96b provide not only stiffening for the flexible sheet 60a, 60b but also serve an additional purpose, as will shortly be pointed out.

In accordance with the present invention, (See FIGS. 1,5 and 6) it is preferred that a transparent sheet 98a, 98b be provided having opposite sheet ends 100a, 100b, 101a, 101b adapted for alignment adjacent the opposite edges 64a, 64b, 66a, 66b of the flexible sheet 60a, 60b and lateral sheet ends 102a, 102b, 103a, 103b adapted for alignment adjacent the lateral edges 68a, 68b, 70a, 70b of the flexible sheet 60a, 60b. It is also preferred that a cover frame 104a, 104b be provided, having opposite cover frame ends 106a, 106b, 108a, 108b attached to the opposite sheet ends 100a, 100b, 101a, 101b of the transparent sheet 98a, 98b and having lateral cover frame ends 110a, 110b, 112a, 112b attached to the lateral sheet ends 102a, 102b, 103a, 103b of the transparent sheet 98. The lateral cover frame ends 106a, 106b, 108a, 108b and the previously mentioned stiffening strips 94a, 94b, 96a, 96b, define a snap engagement structure, 114a, 114b (FIGS. 5 and 6) of the cover frame 104a, 104b to the stiffening strips 94a, 94b, 96a, 96b.

Adverting to FIG. 1, it will be seen that the first end closure 28 and the second end closure 30 are pivotally mounted at 116, as at a pillow block, to a support structure 117. The particular embodiment of FIGS. 1-8 shows a pair of solar reflectors 12a, 12b mounted to a single frame structure 14. As will be apparent, more than two solar reflectors 12a, 12b may be mounted to a single frame structure 14. A central linearly extending rod 120 connects the first end closure 28 with the second end closure 30 generally centrally to provide a balanced overall arrangement.

Figure 9:
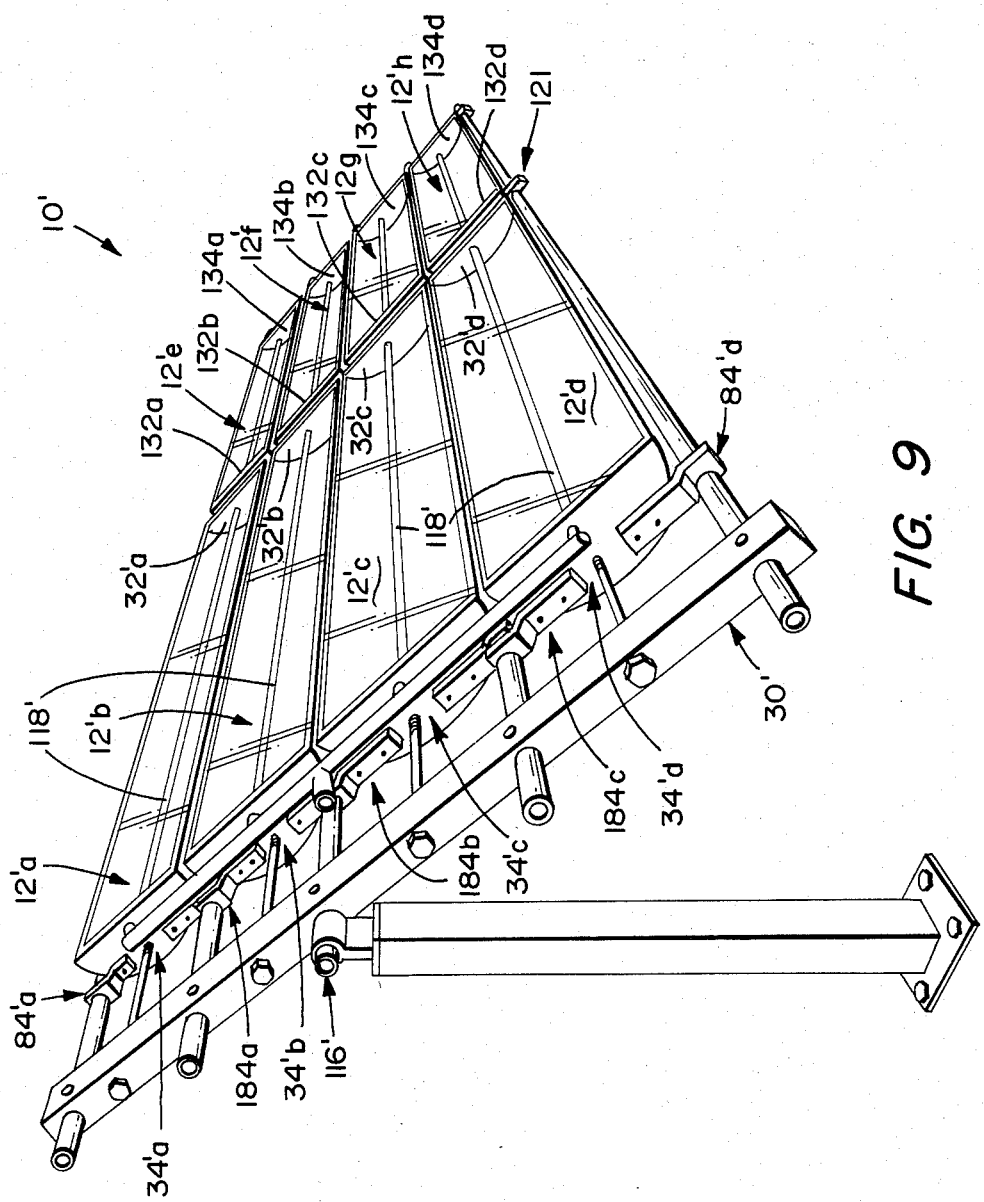
FIG. 9 illustrates an alternative embodiment of the present invention.

FIG. 9 illustrates an embodiment of the present invention wherein eight different solar reflectors 12'a, 12'b, 12'c, 12'd, 12'e, 12'f, 12'g and 12'h form an overall solar collector unit 10'. Arms 84'a, and 84'd serve the same purpose as in the previous embodiment but are somewhat different in structure. Arms 184a, 184b, 184c serve a similar function to arms 84'a and 84'd except that the arms 184a, 184b, 184c attach one second form member 34'a, 34'b, 34'c, 34'd to a next adjacent second form member 34'a, 34'b, 34'c, 34'd. A single central pivotal adjustment at 116' provides tilting to properly focus the sun's rays on a plurality of target pipes 118'. A central frame member 121 serves for holding relatively stationary first form members 32'a, 32'b, 32'c, 132a, 132b, 132c, 132d. Corresponding second frame members 134a, 134b, 134c, 134c are mounted as are second frame members 34'a, 34'b, 34'c, 34'd. Although biasing means such as 56 of FIG. 1 are not shown for the embodiment of FIG. 9 it is contemplated that such may be useful.

INDUSTRIAL APPLICABILITY

A solar reflector 12a, 12b is provided in accordance with the present invention which is useful for concentrating the sun's rays to heat fluids in pipes 118. The heated fluid can be used to generate energy, to heat a living or work space, or to heat anything needing heating.

While the invention has been described in conjunction with certain preferred embodiments thereof it will be obvious that modifications and changes may be made in the invention by those skilled in the art to which it pertains without departing from the scope of the invention as defined by the appended claim.

I claim:

1. A solar reflector (12a, 12b), comprising:
   a longitudinally extending frame structure (14) having first (20, 22) and second (24, 26) ends and a second frame end closure (30);
   a first form member (32a, 32b) attached generally across said first end (20, 22);
   a second form member (34a, 34b) parallel to said first form member (32a, 32b) and in-board of said second end closure (30), said first (32a, 32b) and second (34a, 34b) form members (32a, 32b, 34a, 34b) having peripheries (36a, 36b, 38a, 38b) having identical form surfaces (40a, 40b, 42a, 42b) along portions thereof;
   a support member (44a, 44b) attached to a respective one (30 or 34a, 34b) of said second end closure (30) and said second form member (34a, 34b) and extending toward a respective other (34a, 34b, or 30) thereof, said support member (44a, 44b) being adapted for transferring the weight of said second form member (34a, 34b) to said second end closure (30);
   a flexible sheet (60a, 60b) of a material having a reflective in-facing surface (62) having opposite edges (64a, 64b, 66a, 66b) adapted for attachment to said identical form surfaces (40a, 40b, 42a, 42b) and having lateral edges (68a, 68b, 70a, 70b) generally perpendicular to said first and second form members (32a, 32b, 34a, 34b);
   securing means (72a, 72b, 74a, 74b) for securing said opposite edges (64a, 64b, 66a, 66b) to said identical form surfaces (40a, 40b, 42a, 42b); and
   stretching means (55) for stretching said flexible sheet (60a, 60b) between said first (32a, 32b) and second (34a, 34b) form members (32a, 32b, 34a, 34b).

2. A solar reflector (12a, 12b) as set forth in claim 1, further including:
   biasing means (56) for biasing said second form member (34a, 34b) toward the second end closure (30) sufficiently to compensate for differences in thermal expansion of the materials of construction of the solar reflector (12a, 12b) for maintaining tension in said flexible sheet (60a, 60b).

3. A solar reflector (12a, 12b) as set forth in claim 2, wherein said support member 44a, 44b) has first 46a, 46b) and second (54a, 54b) ends (46a, 46b, 54a, 54b), wherein a respective one of said second end closure (30) and said second form member (34a, 34b) includes an opening (48a, 48b) therethrough from a facing side thereof facing a respective other of said second end closure (30) and said second form member (34a, 34b) to a removed side thereof removed from said respective other of said second end closure (30) and said second form member (34a, 34b), wherein said first end (46a, 46b) of said support member (44a, 44b) is attached to said respective other of said second end closure (30) and said second form member (34a, 34b), wherein said second end (54a, 54b) of said support member (44a, 44b) extends through said opening (48a, 48b), wherein said biasing means (56) includes a spring (57) biasing said second end (54a, 54b) away from said removed side of said respective one of said second end closure (30) and said second form member (34a, 34b).

4. A solar reflector (12a, 12b) as set forth in claim 1, further including:
   first (94a, 94b) and second (96a, 96b) stiffening strips (94a, 94b, 96a, 96b) attached to said lateral edges (68a, 68b, 70a, 70b) of said flexible sheet (60a, 60b).

5. A solar reflector (12a, 12b) as set forth in claim 4, further including:
   a transparent cover structure (98, 104a, 104b) adapted to attach to said form members (32a, 32b, 34a, 34b) and to said lateral edges (68a, 68b, 70a, 70b) of said flexible sheet (60a, 60b) in covering relation to said solar reflector (12a, 12b).

6. A solar reflector (12a, 12b) as set forth in claim 4 further including:
   a transparent sheet (98) having opposite sheet ends (100a, 100b, 101a, 101b) adapted for alignment adjacent said form members (32a, 32b, 34a, 34b) and having lateral sheet ends (102a, 102b, 103a, 103b) adapted for alignment adjacent said lateral edges (68a, 68b, 70a, 70b) of said flexible sheet (60a, 60b);
   a cover frame (104a, 104b) having opposite cover frame ends (106a, 106b, 108a, 108b) attached to said opposite sheet ends (100a, 100b, 101a, 101b) of said transparent sheet (98a, 98b) and having lateral cover frame ends (110a, 110b, 112a, 112b) attached to said lateral sheet ends (102a, 102b, 103a, 103b) of said transparent sheet (98a, 98b), said lateral cover frame ends (110a, 110b, 112a, 112b) and said stiffening strips (94a, 94b, 96a, 96b) defining a snap engagement structure (114a, 114b) of said cover frame (104a, 104b) to said stiffening strips (94a, 94b, 96a, 96b).

7. A solar reflector unit (10) comprising a plurality of said solar reflectors (12a, 12b) as set forth in claim 1 in parallel array on said frame structure (14).

8. A solar reflector unit (10) as set forth in claim 7, further including:
   means (116, 117) for generally centrally pivotally supporting said frame structure (14).

9. A solar reflector (12a, 12b) as set forth in claim 1, wherein said support member (44a, 44b) transfers substantially the entire weight of said second form member (34a, 34b) to said second end closure (30).

10. A solar reflector (12a, 12b) as set forth in claim 1, wherein said longitudinally extending frame structure (14) includes first (16) and second (18) generally parallel longitudinally extending spaced-apart lateral frame members (16, 18).

11. A solar reflector (12a, 12b) as set forth in claim 1, further including:
   a biasing structure (56) supported by said support member (44a, 44b) and being of a construction sufficient for biasing said second form member (34a, 34b) toward said second end closure (30) sufficiently to compensate for differences in thermal expansion of the materials of construction of the solar reflector (12a, 12b) for maintaining tension in said flexible sheet (60a, 60b).

12. A solar reflector (12a, 12b), comprising:
   a longitudinally extending frame structure (14) having first (20, 22) and second (24, 26) ends and a second frame end closure (30);
   a first form member (32a, 32b) attached generally across said first end (20, 22);
   a second form member (34a, 34b) parallel to said first form member (32a, 32b) and in-board of said second end closure (30), said first (32a, 32b) and second (34a, 34b) form members (32a, 32b, 34a, 34b) having peripheries (36a, 36b, 38a, 38b) having identical form surfaces (40a, 40b, 42a, 42b) along portions thereof;
   a support member (44a, 44b) attached to a respective one (30 or 34a, 34b) of said second end closure (30) and said second form member (34a, 34b) and extending toward a respective other (34a, 34b, or 30) thereof, said support member (44a, 44b) being adapted for transferring the weight of said second form member (34a, 34b) to said second end closure (30);
   a flexible sheet (60a, 60b) of a material having a reflective in-facing surface (62) having opposite edges (64a, 64b, 66a, 66b) adapted for attachment to said identical form surfaces (40a, 40b, 42a, 42b) and having lateral edges (68a, 68b, 70a, 70b) generally perpendicular to said first and second form members (32a, 32b, 34a, 34b);
   securing means (72a, 72b, 74a, 74b) for securing said opposite edges (64a, 64b, 66a, 66b) to said identical form surfaces (40a, 40b, 42a, 42b);
   stretching means (55) for stretching said flexible sheet (60a, 60b) between said first (32a, 32b) and second (34a, 34b) form members (32a, 32b, 34a, 34b);
   biasing means (56) for biasing said second form member (34a, 34b) toward the second end closure (30) sufficiently to compensate for differences in thermal expansion of the materials of construction of the solar reflector (12a, 12b) for maintaining tension in said flexible sheet (60a, 60b); and
   wherein said support member (44a, 44b) has a first end (46a, 46b) attached to said second form member (34a, 34b) generally centrally thereof, wherein said second end closure (30) includes an opening (48a, 48b) therethrough from a second form member facing side (50) to a second form member removed side (52), wherein said support member (44a, 44b) has a second end (54a, 54b) which extends through said opening (48a, 48b) and wherein said biasing means (56) includes a spring (57) biasing said second end (54a, 54b) away from said second form member removed side (52) of said second end closure (30).

13. A solar reflector (12a, 12b) as set forth in claim 12 further including:
   a sleeve (58) surrounding said support member (44a, 44b) and supported by said second form member (34a, 34b), said sleeve (58) being of a length and construction sufficient to limit how closely said support member (44a, 44b) can approach said second form member (34a, 34b).

14. A solar reflector (12a, 12b), comprising:
   a longitudinally extending frame structure (14) having first (20, 22) and second (24, 26) ends and a second frame end closure (30);

a first form member (32a, 32b) attached generally across said first end (20, 22);

a second form member (34a, 34b) parallel to said first form member (32a, 32b) and in-board of said second end closure (30), said first (32a, 32b) and second 34a, 34b) form members (32a, 32b, 34a, 34b) havng peripheries (36a, 36b, 38a, 38b) having identical form surfaces (40a, 40b, 42a, 42b) along portions thereof;

a support member (44a, 44b) attached to a respective one (30 or 34a, 34b) of said second end closure (30) and said second form member (34a, 34b) and extending toward a respective other (34a, 34b, or 30) thereof, said support member (44a, 44b) being adapted for transferring the weight of said second form member (34a, 34b) to said second end closure (30);

a flexible sheet (60a, 60b) of a material having a reflective in-facing surface (62) having opposite edges (64a, 64b, 66 a, 66b) adapted for attachment to said identical form surfaces (40a, 40b, 42a, 42b) and having lateral edges (68a, 68b, 70a, 70b) generally perpendicular to said first and second form members (32a, 32b, 34a, 34b);

securing means (72a, 72b, 74a, 74b) for securing said opposite edges (64a, 64b, 66a, 66b) to said identical form surfaces (40a, 40b, 42a, 42b);

stretching means (55) for stretching said flexible sheet (60a, 60b) between said first (32a, 32b) and second (34a, 34b) form members (32a, 32b, 34a, 34b);

wherein said longitudinally extending frame structure (14) includes first (16) and second (18) generally parallel longitudinally extending spaced-apart lateral frame members (16, 18);

an arm (84a, 84b) having first (86a, 86b) and said second (88a, 88b) longitudinally separated portions (86a, 86b, 88a, 88b), said first portion (86a, 86b) being adjacent a respective one (16 or 18) of said lateral frame member (16, 18) and said second portion (88a, 88b) being adjacent said second form member (34a, 34b);

means (90) for attaching said first portion (86a, 86b) to said respective one (16 or 18) of said lateral frame members (16, 18); and means (92) for attaching said second portion (88a, 88b) to said second form member (34a, 34b).

15. A solar reflector (12a, 12b), comprising:
a longitudinally extending frame structure (14) having first (20, 22) and second (24, 26) ends and a second frame end closure (30);
a first form member (32a, 32b) attached generally across said first end (20, 22);
a second form member (34a, 34b) parallel to said first form member (32a, 32b) and in-board of said second end closure (30), said first (32a, 32b) and second (34a, 34b) form members (32a, 32b, 34a, 34b) having peripheries (36a, 36b, 38a, 38b) having identical form surfaces (40a, 40b, 42a, 42b) along portions thereof;
a support member (44a, 44b) attached to a respective one (30 or 34a, 34b) of said second end closure (30) and said second form member (34a, 34b) and extending toward a respective other (34a, 34b, or 30) thereof, said support member (44a, 44b) being adapted for transferring the weight of said second form member (34a, 34b) to said second end closure (30);
a flexible sheet (60a, 60b) of a material having a reflective in-facing surface (62) having opposite edges (64a, 64b, 66a, 66b) adapted for attachment to said identical form surfaces (40a, 40b, 42a, 42b) and having lateral edges (68a, 68b, 70a, 70b) generally perpendicular to said first and second form members (32a, 32b, 34a, 34b);
securing means (72a, 72b, 74a, 74b) for securing said opposite edges (64a, 64b, 66a, 66b) to said identical form surfaces (40a, 40b, 42a, 42b);
stretching means (55) for stretching said flexible sheet (60a, 60b) between said first (32a, 32b) and second (34a, 34b) form members (32a, 32b, 34a, 34b); and
means (84a, 84b) for preventing rotation of said second form member (34a, 34b) relative to said frame structure (14).

16. A solar reflector (12a, 12b), comprising:
a longitudinally extending frame structure (14) having first (20, 22) and second (24, 26) ends and a second frame end closure (30);
a first form member (32a, 32b) attached generally across said first end (20, 22);
a second form member (34a, 34b) parallel to said first form member (32a, 32b) and in-board of said second end closure (30), said first (32a, 32b) and second (34a, 34b) form members (32a, 32b, 34a, 34b) having peripheries (36a, 36b, 38a, 38b) having identical form surfaces (40a, 40b, 42a, 42b) along portions thereof;
a support member (44a, 44b) attached to a respective one (30 or 34a, 34b) of said second end closure (30) and said second form member (34a, 34b) and extending toward a respective other (34a, 34b, or 30) thereof, said support member (44a, 44b) being adapted for transferring the weight of said second form member (34a, 34b) to said second end closure (30);
a flexible sheet (60a, 60b) of a material having a reflective in-facing surface (62) having opposite edges (64a, 64b, 66a, 66b) adapted for attachment to said identical form surfaces (40a, 40b, 42a, 42b) and having lateral edges (68a, 68b, 70a, 70b) generally perpendicular to said first and second form members (32a, 32b, 34a, 34b);
securing means (72a, 72b, 74a, 74b) for securing said opposite edges (64a, 64b, 66a, 66b) to said identical form surfaces (40a, 40b, 42a, 42b);
stretching means (55) for stretching said flexible sheet (60a, 60b) between said first (32a, 32b) and second (34a, 34b) form members (32a, 32b, 34a, 34b); and
wherein said peripheries (36a, 36b, 38a, 38b) of said first (32a, 32b) and second (34a, 34b) form members (32a, 32 b, 34a, 34b) have trenches (43a, 43b) extending therealong outboard of and adjacent to said form surfaces (40a, 40b, 42a, 42b), and wherein said securing means (72a, 72b, 74a, 74b) includes first (76a, 76b) and second (78a, 78b) strap members (76a, 76b, 78a, 78b) adapted for fitting in said trenches (43a, 43b) and means (80a, 80b) for aligning said strap members (76a, 76b, 78a, 78b) in fitting relation with said trenches (43a, 43b) with said opposite edges (64a, 64b, 66a, 66b) of said flexible sheet (60a, 60b) sandwiched therebetween.

17. A solar reflector (12a, 12b) as set forth in claim 10, wherein said securing means (72a, 72b, 74a, 74b) further includes means (82a, 82b) for longitudinally tensioning said first (76a, 76b) and second (78a, 78b) strap members (76a, 76b, 78a, 78b) for bearing inwardly against said opposite edges (64a, 64b, 66a, 66b) of said flexible sheet (60a, 60b).

* * * * *

UNITED STATES PATENT AND TRADEMARK OFFICE
CERTIFICATE OF CORRECTION

PATENT NO. : 4,510,923
DATED : April 16, 1985
INVENTOR(S) : ALLEN J. BRONSTEIN

It is certified that error appears in the above-identified patent and that said Letters Patent is hereby corrected as shown below:

Column 5, line 66, "frame" should be --form--.

Column 5, line 67, "frame" should be --form--.

Column 7, line 7, before "wherein" insert --and--.

Signed and Sealed this

Third Day of September 1985

[SEAL]

Attest:

DONALD J. QUIGG

Attesting Officer    Acting Commissioner of Patents and Trademarks - Designate